(12) United States Patent
Belyew

(10) Patent No.: US 8,439,295 B2
(45) Date of Patent: May 14, 2013

(54) AIRCRAFT ENGINE INLET PIVOTABLE BARRIER FILTER

(75) Inventor: Robert R. Belyew, St. Charles, MO (US)

(73) Assignee: Aerospace Filtration Systems, Inc., Chesterfield, MO (US)

( * ) Notice: Subject to any disclaimer, the term of this patent is extended or adjusted under 35 U.S.C. 154(b) by 67 days.

(21) Appl. No.: 12/373,673

(22) PCT Filed: Jul. 10, 2007

(86) PCT No.: PCT/US2007/073125
§ 371 (c)(1),
(2), (4) Date: Jan. 13, 2009

(87) PCT Pub. No.: WO2008/076471
PCT Pub. Date: Jun. 26, 2008

(65) Prior Publication Data
US 2009/0261208 A1 Oct. 22, 2009

Related U.S. Application Data

(60) Provisional application No. 60/807,389, filed on Jul. 14, 2006.

(51) Int. Cl.
*B64D 33/02* (2006.01)
(52) U.S. Cl.
USPC ..................... 244/53 B; 60/39.092
(58) Field of Classification Search ............... 244/53 B; 60/39.092; 55/306
See application file for complete search history.

(56) References Cited

U.S. PATENT DOCUMENTS

| | | | | |
|---|---|---|---|---|
| 3,411,272 A | * | 11/1968 | Carmon | 96/418 |
| 3,421,296 A | | 1/1969 | Beurer, Sr. | |
| 3,449,891 A | * | 6/1969 | Amelio et al. | 55/306 |
| 3,483,676 A | * | 12/1969 | Sargisson | 55/306 |
| 4,203,566 A | * | 5/1980 | Lord | 244/57 |
| 4,698,078 A | | 10/1987 | Mavros | |
| 5,662,292 A | | 9/1997 | Greene et al. | |
| 5,697,394 A | * | 12/1997 | Smith et al. | 137/15.1 |
| 5,865,398 A | * | 2/1999 | Pashea et al. | 244/53 B |
| 6,349,899 B1 | * | 2/2002 | Ralston | 244/53 B |
| 6,595,742 B2 | | 7/2003 | Scimone | |
| 6,824,582 B2 | | 11/2004 | Wilson | |
| 7,192,462 B2 | | 3/2007 | Stelzer et al. | |
| 7,491,253 B2 | | 2/2009 | Wilson | |
| 7,575,014 B2 | * | 8/2009 | Stelzer | 137/15.1 |
| 7,600,714 B2 | * | 10/2009 | Sheoran et al. | 244/53 B |
| 7,634,984 B2 | * | 12/2009 | Stelzer et al. | 123/198 E |
| 7,665,694 B2 | * | 2/2010 | Hein et al. | 244/129.5 |

(Continued)

OTHER PUBLICATIONS

FDC/aerofilter; Advertisement; Vertical Magazine; Dec. 2003; p. 51.

(Continued)

*Primary Examiner* — Benjamin P Lee
(74) *Attorney, Agent, or Firm* — Armstrong Teasdale LLP

(57) ABSTRACT

An inlet barrier filter system for an aircraft engine includes a filter panel (35) including filter media for filtering air prior to intake (15) into the engine. The filter panel has a forward edge (F). The system further includes an actuator for selectively pivoting the panel to form an opening around the panel for allowing air to bypass the filter. The opening is rearward of the forward edge of the filter panel.

18 Claims, 5 Drawing Sheets

U.S. PATENT DOCUMENTS

| | | | |
|---|---|---|---|
| 7,803,204 B1* | 9/2010 | Mladinich | 55/306 |
| 2002/0182062 A1* | 12/2002 | Scimone | 415/121.2 |
| 2005/0229558 A1 | 10/2005 | Stelzer et al. | |
| 2006/0196993 A1* | 9/2006 | Hein et al. | 244/53 B |
| 2007/0022723 A1 | 2/2007 | Stelzer | |
| 2007/0025838 A1 | 2/2007 | Stelzer | |
| 2007/0151214 A1 | 7/2007 | Stelzer et al. | |
| 2010/0107576 A1* | 5/2010 | Belyew | 55/306 |
| 2010/0230530 A1* | 9/2010 | Nannoni et al. | 244/17.11 |

OTHER PUBLICATIONS

Product Information; www.fdcaerofilter.com; MD500; Jun. 24, 2009; pp. 3.

* cited by examiner

AIRCRAFT ENGINE INLET PIVOTABLE BARRIER FILTER

CROSS REFERENCE TO RELATED APPLICATIONS

This patent application is a U.S. National Phase patent application of International Application Serial Number PCT/US2007/073125 filed on Jul. 10, 2007, which claims priority from U.S. Provisional Patent Application 60/807,389, filed Jul. 14, 2006.

FIELD OF THE INVENTION

The invention generally relates to barrier filter systems for aircraft engines, and more particularly to barrier filter systems that include a bypass.

BACKGROUND

Barrier filter systems for aircraft engine inlets are typically positioned so that all intake air must flow through the filter prior to reaching the engine. In this way, the barrier filter can inhibit particles from reaching the engine and thereby prevent particle damage to the engine.

Some prior art inlet barrier filter systems for aircraft engines include a "bypass" door that can be opened in the event the barrier filter is clogged during flight. Such clogging may prevent sufficient air from reaching the engine. Thus, the bypass door may be opened during flight to greatly increase the airflow to the engine. While such bypass doors have generally been satisfactory, there are disadvantages.

Generally, bypass doors add to the cost and complexity of the filter system. Accordingly, a simple bypass door is needed.

One prior art design incorporated the bypass door into a filter panel. In other words, the filter panel was pivotable so that air could pass around the panel if the filter was clogged. However, in the prior art design, the filter panel pivoted upward about its rearward edge so that it opened toward the front of the aircraft. This design causes problems, for among other reasons, the opened filter panel acts as a "scoop", drawing particles and debris, including ice, into the intake. These particles and debris can thereafter reach the engine and cause damage to the engine. Also, the design is complicated by the fact that the filter panel is not adjacent the outer contour of the aircraft. Rather, the panel is under a cowling. Accordingly, an improved filter panel system with a simple bypass that minimizes particles and debris is needed.

SUMMARY OF THE INVENTION

In one aspect, an inlet barrier filter system for an aircraft engine generally comprises a filter panel including filter media for filtering air prior to intake into the engine. The filter panel has a forward edge. The system further includes an actuator for selectively pivoting the panel to form an opening around the panel for allowing air to bypass the filter. The opening is rearward of the forward edge of the filter panel.

In another aspect, an inlet barrier filter system for an aircraft engine generally comprises the filter panel and the actuator, and the forward edge of the panel is adapted to be mounted adjacent the outer contour of the aircraft.

In another aspect, an aircraft generally comprises an engine including an intake, an outer contour, and an air filtration system mounted in the intake to remove contaminants from intake air prior to delivery to the engine. The system includes a filter panel mounted adjacent the outer contour and selectively pivotable to allow air to bypass the filter panel.

BRIEF DESCRIPTION OF THE DRAWINGS

Corresponding reference characters indicate corresponding parts throughout the drawings.

DETAILED DESCRIPTION OF THE DRAWINGS

Figure 1:
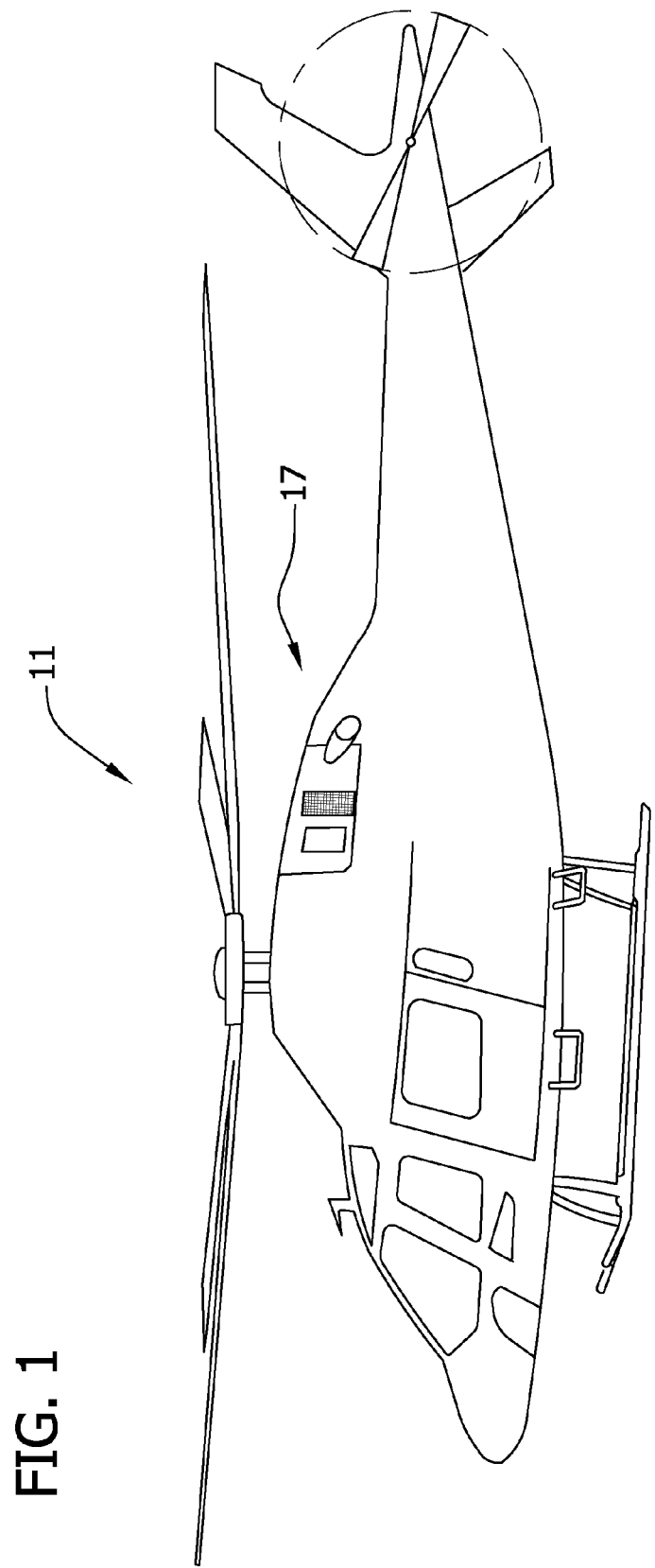
FIG. 1 is a perspective view of a helicopter including a barrier filter system of one embodiment.
Figure 2:
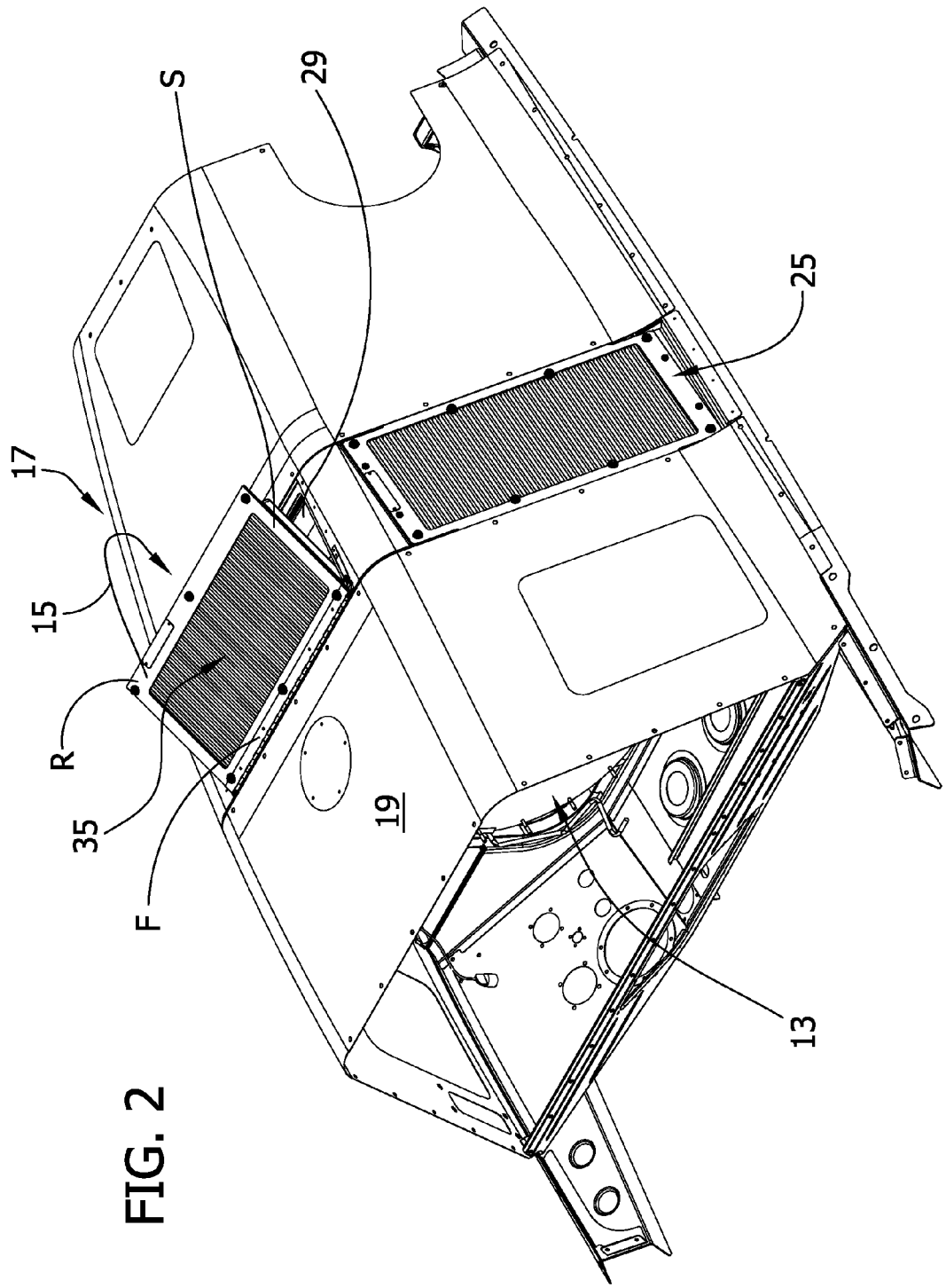
FIG. 2 is a perspective view showing a fuselage of the helicopter having one of the filter panels of the barrier filter system open to allow bypass air around the system.

Referring to FIGS. 1-2, a helicopter (more broadly, an aircraft) of one embodiment is generally designated 11. The helicopter shown in this embodiment is an Agusta Model A119, available from AgustaWestland USA in Philadelphia, Pa., but the invention may be used on many other aircraft. The helicopter of this embodiment generally includes an engine 13 (a jet engine or other type) having an air intake 15, and a fuselage 17 having an outer contour 19. This helicopter is merely exemplary, and other types of aircraft are contemplated within the scope of this invention.

Figure 3:
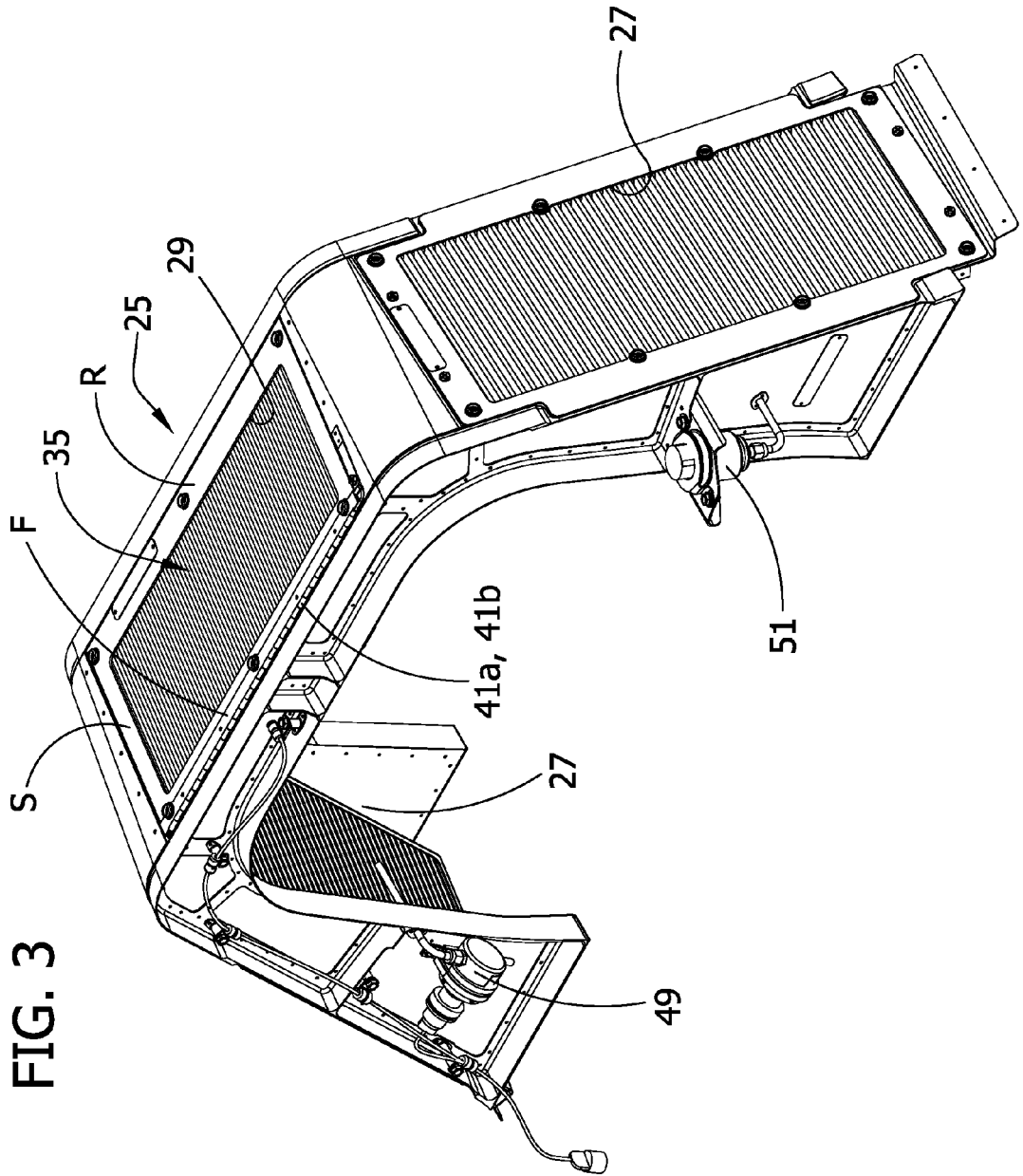
FIG. 3 is a perspective view of the barrier filter system removed from the fuselage.

A section of the fuselage 17 includes at least one opening for receiving inlet barrier filters of a barrier filter system 25 for filtering air prior to its intake into the engine 13. As shown in FIGS. 2-3, there are two side openings 27 that are disposed generally vertically, and one opening 29 in the top surface that is disposed generally horizontally. Generally, the barrier filter system 25 is mounted in the intake path or air intake 15 to inhibit entry of particles, debris, ice and the like into the engine and thereby protect the engine from damage. Any number of openings, including only one, may be used within the scope of this invention.

As shown in FIGS. 2-5, the barrier filter system 25 includes an upper filter panel 35 comprising filter media 37 and a rigid frame 39 around the media. The panel 35 includes forward F, rearward R and side edges S and an upper surface. In this embodiment, the filter panel 35 is rectangular, though other shapes are contemplated within the scope of the invention. The filter panel's upper surface generally conforms to the outer contour of the helicopter. For example in this embodiment, the generally planar surface of the frame is generally aligned with the outer contour of the fuselage to thereby form a portion of the outer contour of the helicopter.

The filter panel 35 is pivotably mounted. In this embodiment, the filter panel forward edge F includes a hinge element 41a (of a piano-style hinge as shown) that engages a mating hinge element 41b on the outer contour of the helicopter. The filter panel is generally pivotable about the hinge. The panel is pivotable upward about the hinge to form an opening generally rearward of the forward edge of the panel. As shown in FIG. 2, the opening 29 is generally under the rearward edge R of the panel, and extends around under the side edges S. Because the opening 29 is rearward of the forward edge, and not under the forward edge as shown in the prior art, debris is less likely to enter the intake. Due to the upward pivoting, the filter panel may also serve to deflect debris away from the opening.

Figure 4:
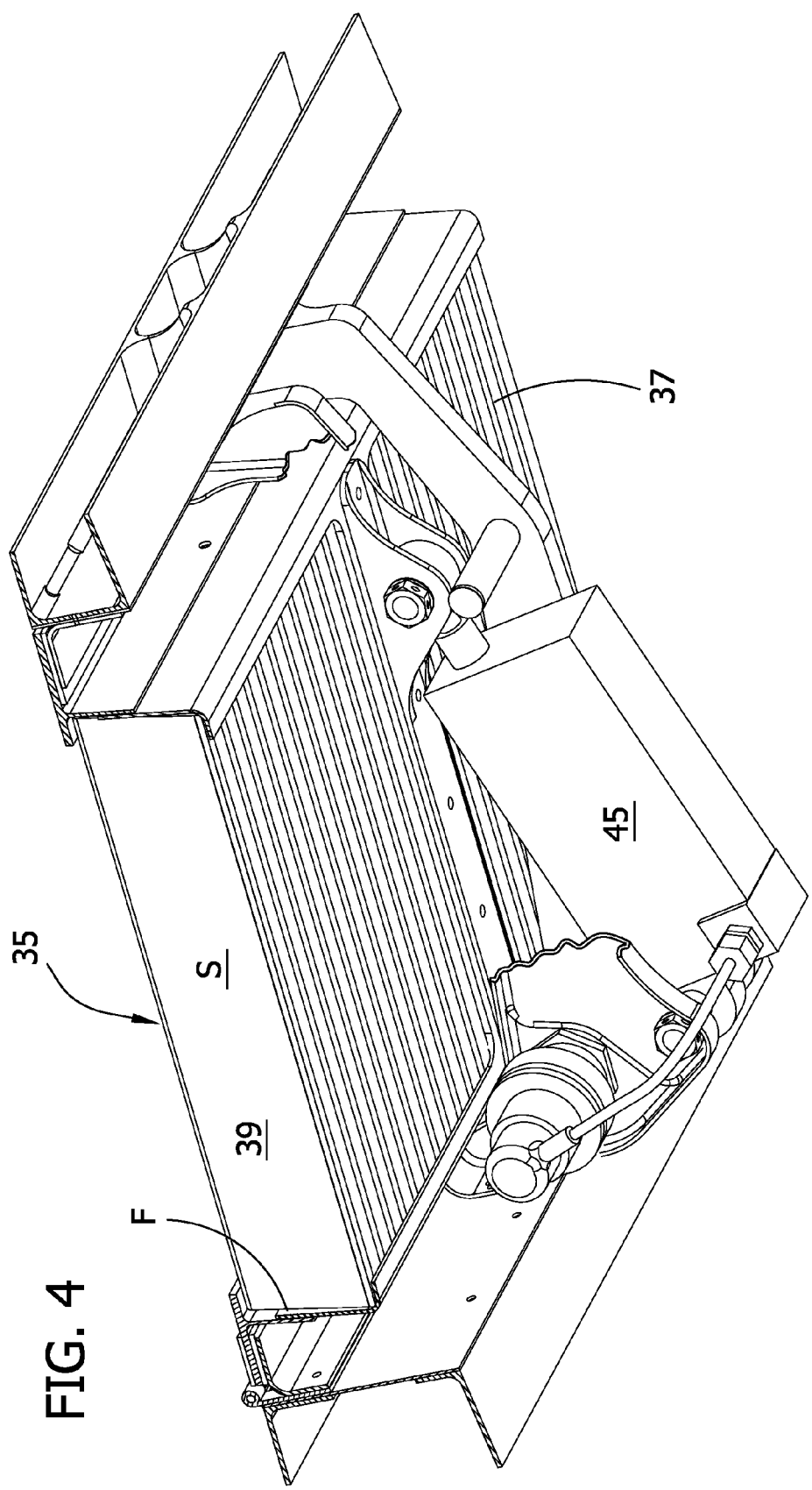
FIG. 4 is a perspective view showing an actuator of the barrier filter system in a retracted position (bypass closed).
Figure 5:
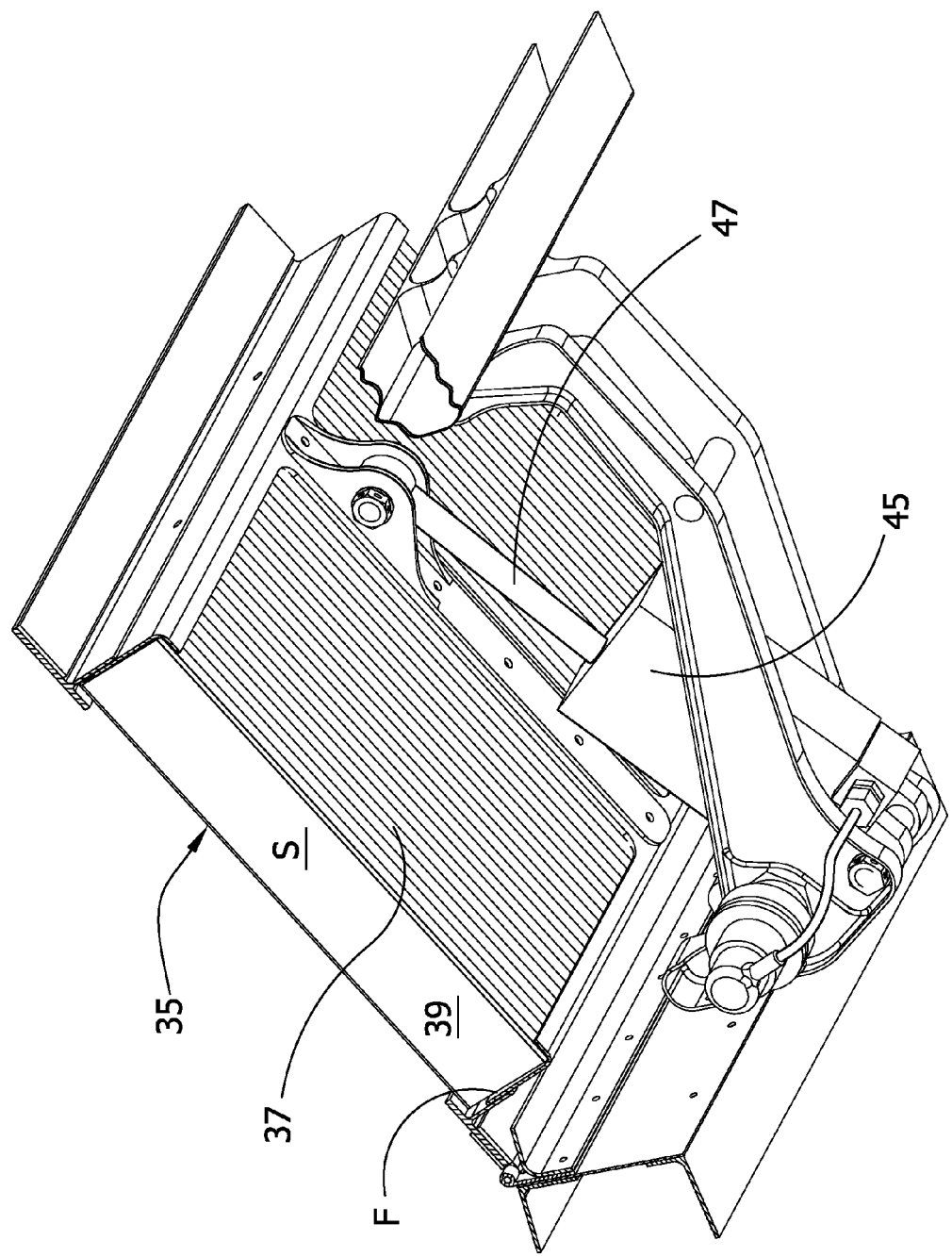
FIG. 5 is a perspective view showing the actuator in the extended position (bypass open).

Referring to FIGS. 4-5, an actuator, e.g., an electromechanical actuator 45, is operably connected to the filter panel 35 to open and close the filter panel. This actuator includes a cylinder 47. The actuator is suitably controlled by a pilot-operated switch (not shown).

A warning system may be provided to notify the pilot of problems with the barrier filter system 25. One such warning system is described in co-assigned U.S. patent application Ser. No. 11/141,630, filed May 31, 2005, and incorporated herein by reference. In the event that the barrier filter system 25 becomes significantly obstructed, a differential pressure sensor 49 (FIG. 3) causes a warning light (not shown) to illuminate in the cockpit. The light alerts the pilot so that the pilot may actuate the switch to open the filter panel 35 for "bypass" to ensure that the engine continues to operate with an adequate quantity of air. The pressure sensor 49 is connected to tubes in communication with regions upstream and downstream of the filter system. A maintenance indicator 51 with tube may also be provided for indicating to maintenance personnel the need for cleaning or replacing the filter panels. It is understood that other configurations for bypass do not depart from the scope of this invention. Note that in addition to the light, there may be a gauge in the cockpit to advise the pilot of the pressure differential.

The filter media may be a variety of types, including without limitation the media described in the above-referenced patent and application, and in co-assigned U.S. Pat. Nos. 6,824,582 and 6,595,742, and U.S. Patent Application No. 60/763,442, filed Jan. 30, 2006 all of which are incorporated herein by reference. The filter media extends generally downward from the outer surface of the filter panel. Suitable seals are formed around each filter panel to inhibit air from entering the intake without passing through the filters (except when the panel is opened as described above).

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An inlet barrier filter system for an aircraft engine comprising:
a filter panel including barrier filter media for filtering air prior to intake into the engine, the filter panel having a forward edge,
an actuator for selectively pivoting the entire panel from a first position inhibiting unfiltered air from entering the intake to a second position that is outward from the first position to form an opening around a portion of the panel to allow air to bypass the filter and to inhibit unfiltered air from entering the intake from a direction forward of the panel,
wherein the opening is rearward of the forward edge of the filter panel, and
wherein the filter panel does not include a centrifugal particle separator.

2. The inlet barrier filter system of claim 1 wherein the filter panel pivots upward to further inhibit entry of debris into the opening.

3. The inlet barrier filter system of claim 1 in combination with the aircraft, the aircraft including an outer contour, and wherein the forward edge of the filter panel is mounted to meet the outer contour of the aircraft.

4. The inlet barrier filter system of claim 1 in combination with the aircraft, the aircraft including an outer contour, the filter panel having an outer surface forming a portion of the outer contour of the aircraft.

5. The inlet barrier filter system of claim 1 wherein the filter media is a layered material.

6. The inlet barrier system of claim 5 wherein the filter media is pleated and includes at least one of woven cotton, polyester or felt.

7. An inlet barrier filter system for an aircraft engine comprising:
a filter panel including barrier filter media for filtering air prior to intake into the engine, the filter panel having a forward edge adapted to be mounted adjacent the outer contour of the aircraft,
wherein the filter panel does not include a centrifugal particle separator, and
an actuator for selectively pivoting the entire panel from a first position inhibiting unfiltered air from entering the intake to a second position that is outward from the first position to form an opening around a portion of the panel to allow air to bypass the filter and to inhibit unfiltered air from entering the intake from a direction forward of the panel.

8. The inlet barrier filter system of claim 7 wherein the filter panel pivots upward to further inhibit entry of debris into the opening.

9. The inlet barrier filter system of claim 7 in combination with the aircraft wherein the forward edge of the filter panel is mounted to meet the outer contour of the aircraft.

10. The inlet barrier filter system of claim 7 in combination with the aircraft, the filter panel having an outer surface forming a portion of the outer contour of the aircraft.

11. The inlet barrier filter system of claim 7 wherein the filter media includes woven cotton, polyester or felt.

12. The inlet barrier system of claim 11 wherein the filter media is impregnated with oil.

13. A helicopter comprising an engine including an intake, an outer contour, a barrier air filtration system mounted in the intake to remove contaminants from intake air prior to delivery to the engine, the system including a filter panel mounted adjacent the outer contour and selectively pivotable about a single axis to a position extending substantially outward from the contour to allow air to bypass the filter panel and to inhibit unfiltered air from entering the intake from a direction forward of the panel, wherein the filter panel does not include a centrifugal particle separator.

14. The helicopter of claim 13 wherein the filter panel pivots upward to further inhibit entry of debris into the opening.

15. The helicopter of claim 14 wherein the forward edge of the filter panel is mounted to meet the outer contour of the helicopter.

16. The helicopter of claim 15 wherein the filter panel has an outer surface forming a portion of the outer contour of the helicopter.

17. The helicopter of claim 13 wherein the pleated filter media includes layers of woven material.

18. The helicopter of claim 17 wherein the pleated filter media is impregnated with oil.

* * * * *